United States Patent [19]
Kawabata et al.

[11] Patent Number: 5,548,348
[45] Date of Patent: Aug. 20, 1996

[54] DISTRIBUTED PROJECTION TYPE LIQUID CRYSTAL DISPLAY DEVICE

[75] Inventors: Hideyuki Kawabata; Naoki Matsuzaka, both of Tokyo, Japan

[73] Assignee: Japan Aviation Electronics Industry Limited, Tokyo, Japan

[21] Appl. No.: 354,046

[22] Filed: Dec. 6, 1994

[30] Foreign Application Priority Data

Dec. 10, 1993 [JP] Japan ................. 5-066076 U

[51] Int. Cl.[6] ......................... H04N 5/7
[52] U.S. Cl. ................ 348/766; 348/756; 348/840; 253/82
[58] Field of Search ................. 348/744, 751, 348/756, 757, 759, 761, 766, 779, 780, 781, 782, 783, 785, 790, 795, 840, 841, 842, 42, 46, 47, 49, 51, 52, 54, 59; 353/30, 34, 37, 82; H04N 5/64, 5/74

[56] References Cited

U.S. PATENT DOCUMENTS

| 2,051,848 | 8/1932 | Hamer | 353/49 |
|---|---|---|---|
| 3,792,198 | 2/1974 | Hanson et al. | 348/832 |
| 3,818,125 | 6/1974 | Butterfield | 348/42 |
| 4,288,819 | 9/1981 | Williams | 348/588 |
| 4,743,964 | 5/1988 | Allard et al. | 348/52 |
| 4,879,603 | 11/1989 | Berman | 348/832 |
| 5,153,621 | 10/1992 | Vogeley | 353/37 |

Primary Examiner—James J. Groody
Assistant Examiner—Michael H. Lee
Attorney, Agent, or Firm—Pollock, Vande Sande & Priddy

[57] ABSTRACT

Light from a light source 12 is incident to a transmission type liquid crystal display panel 11 and the light transmitted therethrough is incident to two reflecting surfaces 14a and 14b of a polygon mirror 14. A shield plate 16 is interposed between a line dividing the display surface of the liquid crystal display panel 11 into equal right and left surfaces areas and the marginal edge of the polygon mirror 14 along which its reflecting surfaces 14a and 14b adjoin. Light transmitted through the right-hand surface area of the liquid crystal display panel and light transmitted through its left-hand surface area are reflected by the reflecting surfaces 14a and 14b, respectively, and are further reflected forward by reflecting mirrors 21a and 21b for projection onto screens 17a and 17b by projection lenses 22a and 22b.

3 Claims, 7 Drawing Sheets

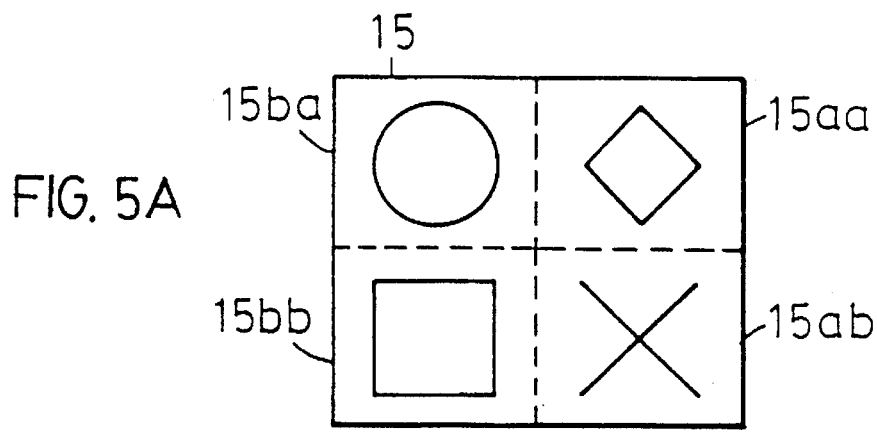
FIG. 5A
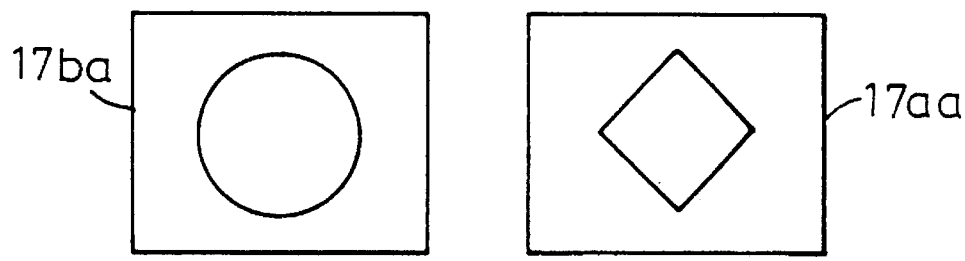
FIG. 5D  FIG. 5B
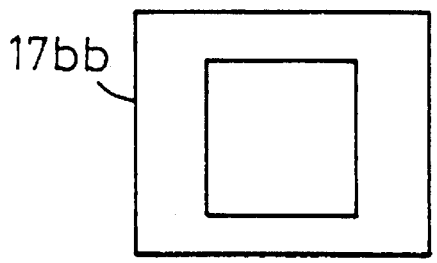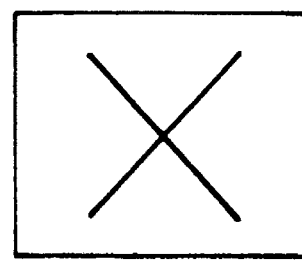
FIG. 5E  FIG. 5C FIG.10C  FIG.10A
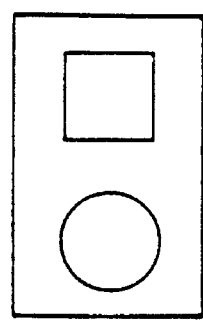
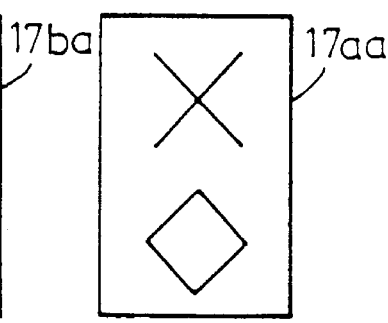
FIG.10D  FIG.10B
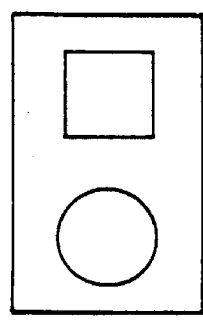
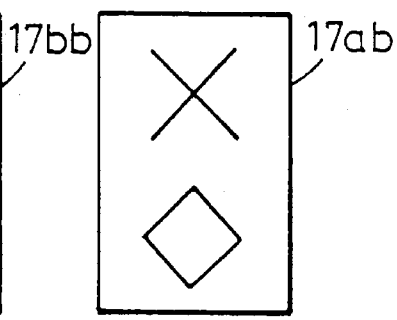
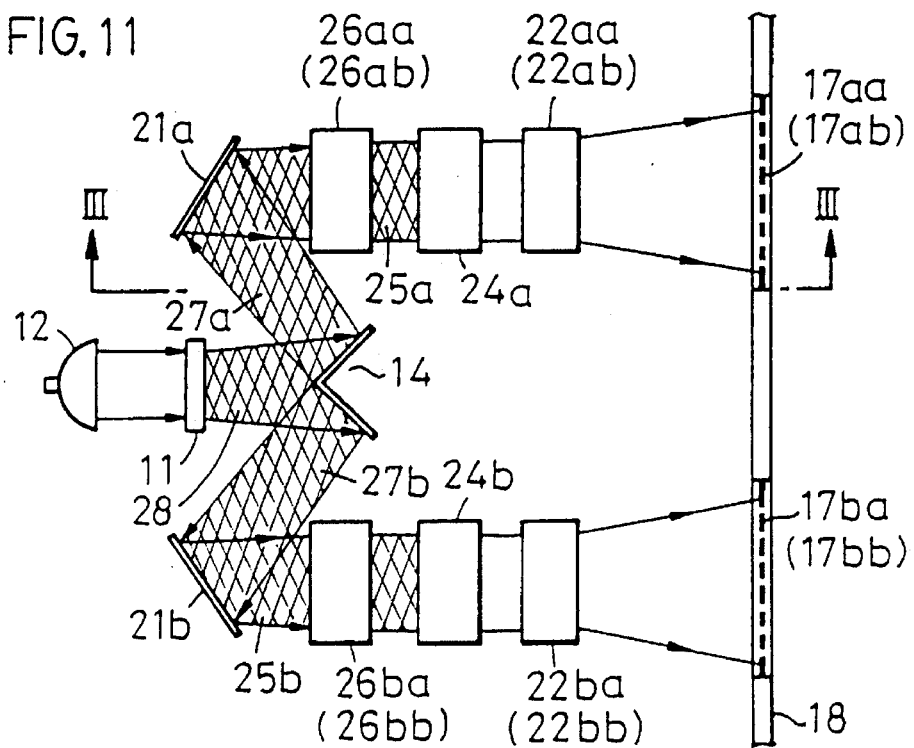

5,548,348

DISTRIBUTED PROJECTION TYPE LIQUID CRYSTAL DISPLAY DEVICE

BACKGROUND OF THE INVENTION

The present invention relates to a display device for use with video games, for instance, and, more particularly, to a display device with which it is possible to provide different or identical and changeable displays at a plurality of places on one panel.

In some types of video game, display units are provided at a plurality of places on the game panel to display figures, symbols, letters and the like, and provision is made for changing the displays on some or all of the display units as the game proceeds.

A conventional display device of this kind usually has liquid crystal or CRT display units provided on the game panel at places where it is desired to provide displays, and hence the display device is relatively expensive; in particular, the use of color liquid crystal display units with relatively large display screens appreciably raises the cost of the display device. There has also been proposed a projection liquid crystal display device of the type that provides a large display by projecting a display image of a small color liquid crystal display unit onto a projection screen as a magnified image. This projection liquid crystal display device is relatively low-cost, but the provision of such projection liquid crystal display devices at a plurality of places as in the case of the video game will incur great expense and consume much space as well.

It is therefore an object of the present invention to provide a projection liquid crystal display device which is capable of providing displays at a plurality of places but is low-cost and relatively small in a size.

SUMMARY OF THE INVENTION

In the distributed projection type liquid crystal display device according to the present invention, a transmission type liquid crystal display panel for displaying an image is irradiated with light from a light source, the light having passed through the liquid crystal display panel is incident on a polygon mirror and is reflected by its respective reflecting surfaces in different directions and the reflected rays of light are projected by projection lens means onto individual screens provided at different places.

According to one aspect of the present invention, the optical paths or spaces between the respective reflecting surfaces of the polygon mirror and respective surface areas of the liquid crystal display panel are optically isolated by a shield plate, and a projection lens is disposed as projection lens means at a stage subsequent to the polygon mirror for each projection screen. With this construction, the display image on the liquid crystal display panel is split into individual images corresponding to the respective display surface areas of the liquid crystal display panel and these images are each displayed on the corresponding projection screen.

According to another aspect of the present invention, one projection lens is disposed as the projection lens means at a stage preceding the polygon mirror and the optical path lengths from the respective reflecting surfaces of the polygon mirror to the corresponding screens are equal to each other. With this construction, the display image on the liquid crystal display panel is displayed intact on all the projection screens.

According to still another aspect of the present invention, the display image on the liquid crystal display panel is split by the shield plate into individual images corresponding to the respective reflecting surfaces of the polygon mirror, the thus split rays of light are reflected by the reflecting surfaces of the polygon mirror and are further reflected by reflecting surfaces of other polygon mirrors to different directions for projection onto individual screens. Between the polygon mirror for splitting the display image on the liquid crystal display panel into individual images and each of the polygon mirrors to which the individual images are incident, a projection lens is disposed as projection lens means to thereby project the same split image onto each screen in common to each polygon mirror.

BRIEF DESCRIPTION OF THE DRAWINGS

FIG. 5A is a diagram showing an example of the display image on the liquid crystal display panel of the FIG. 3 embodiment;

FIGS. 5B through 5E are diagrams showing display images projected on screens 17aa, 17ab, 17ba and 17bb respectively corresponding to the display image of FIG. 5A;

FIGS. 10A–10D are diagrams showing examples of images projected on screens 17aa, 17ab, 17ba and 17bb in the embodiment depicted in FIGS. 8 and 9;

FIG. 11 is a plan view illustrating still another embodiment of the present invention in which the display image on the liquid crystal display panel is split into individual images and these images are each displayed on a plurality of screens;

DESCRIPTION OF THE PREFERRED EMBODIMENTS

Figure 1:
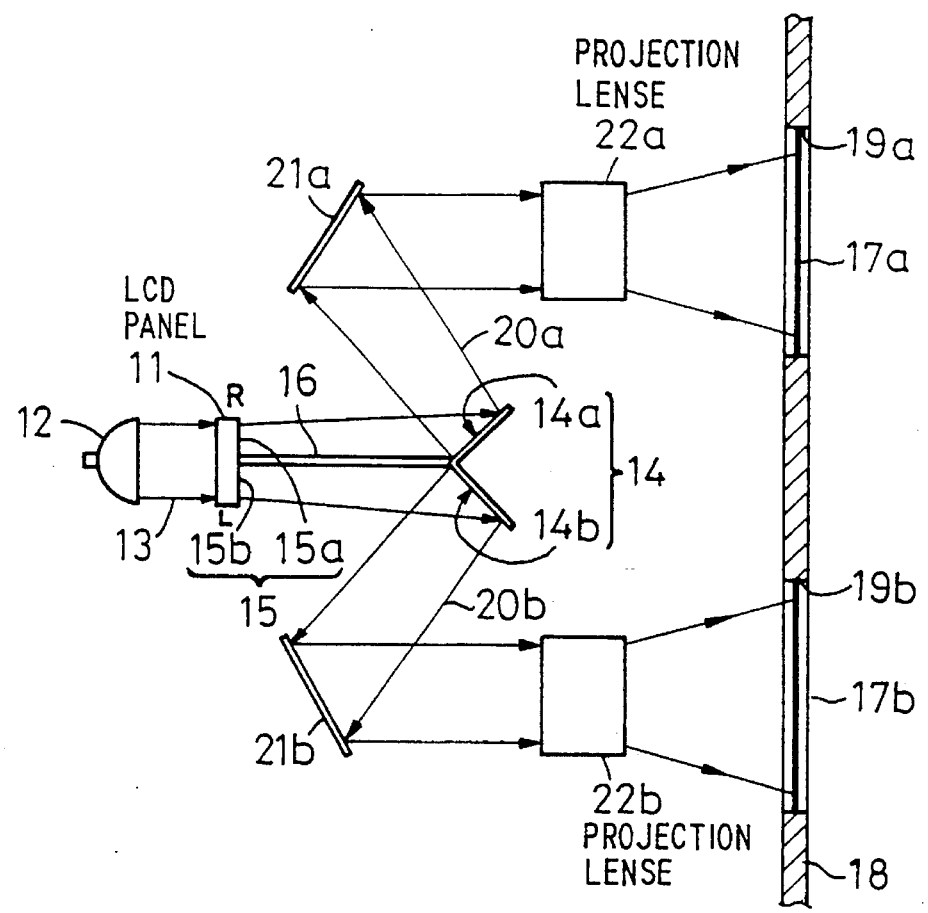
FIG. 1 is a plan view illustrating an embodiment of the present invention in which a display image on a liquid crystal display panel is split into individual images for projection onto different screens.

In FIG. 1 there is illustrated an embodiment of the present invention. Light 13 impinges on the back of a transmission type liquid crystal display panel 11 from a light source 12. The liquid crystal display panel 11 has a driver and displays an image corresponding to an image signal which is supplied from the outside. Disposed in front of the liquid crystal display panel 11 is a polygon mirror 14, which is shown, in this example, to have two square reflecting surfaces 14a and 14b coupled together at an angle of about 270 degrees and disposed widthwise of the display panel 11. The optical paths or spaces between the reflecting surfaces 14a and 14b of the polygon mirror 14 and surface areas 15a and 15b of the liquid crystal display panel 11 are optically isolated by a shield plate 16. That is, the shield plate 16 is held in contact at one end with a line dividing the display surface 15 of the liquid crystal display panel 11 into the two equal right and left surface areas 15a and 15b, and at the other end is held in contact with the marginal edge or ridge at the junction of reflecting surfaces 14a and 14b of polygon mirror 14.

Figure 2A:
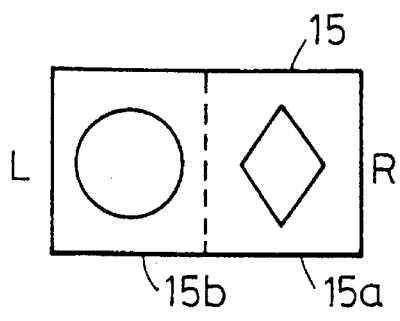
FIG. 2A is a diagram showing an example of the display image on the liquid crystal display panel.

With such a construction, when circular and rhombic images are formed side by side on the display surface 15 of the liquid crystal display panel 11 as shown in FIG. 2A, that is, when the rhombic is displayed on the right half area 15a of the display surface 15 and the circular image on the left half area 15b, the images on the display areas 15a and 15b are projected onto the reflecting surfaces 14a and 14b of the polygon mirror 14, respectively, by the light passing through the display panel 11.

Figure 2B:
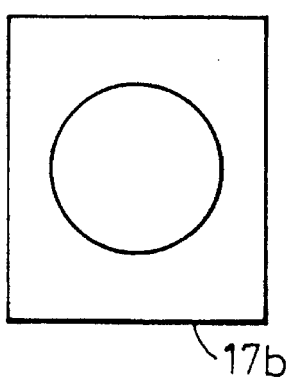
FIGS. 2B and 2C are diagrams showing display images projected on screens 17a and 17b respectively corresponding to the display image of FIG. 2A.
Figure 2C:
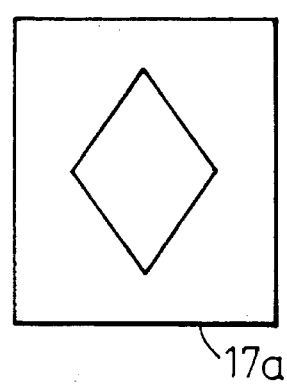

The light, which has passed through the liquid crystal display panel 11 and reached the polygon mirror 14, is reflected by its reflecting surfaces 14a and 14b to different directions and projected onto translucent projection screens 17a and 17b provided at different places. In this example, the translucent projection screens 17a and 17b, which have scattering surfaces, are fitted in openings 19a and 19b made in, for example, the panel 18 of the game machine disposed at the side opposite from the display panel 11 with respect to the polygon mirror 14. Reflected rays 20a and 20b from the reflecting surfaces 14a and 14b of the polygon mirror 14 are incident on reflecting mirrors 21a and 21b disposed inward at an angle of about 45 degrees to the direction of arrangement of the liquid crystal display panel 11 and the polygon mirror 14, and consequently, the reflected rays 20a and 20b are reflected forward by the reflecting mirrors 21a and 21b and are projected by projection lenses 22a and 22b onto the screens 17a and 17b to form images. Thus, the images on the right and left half display areas of the liquid crystal display panel 11 are displayed on the projection screens 17a and 17b separately of each other as shown in FIGS. 2B and 2C.

Figure 3:
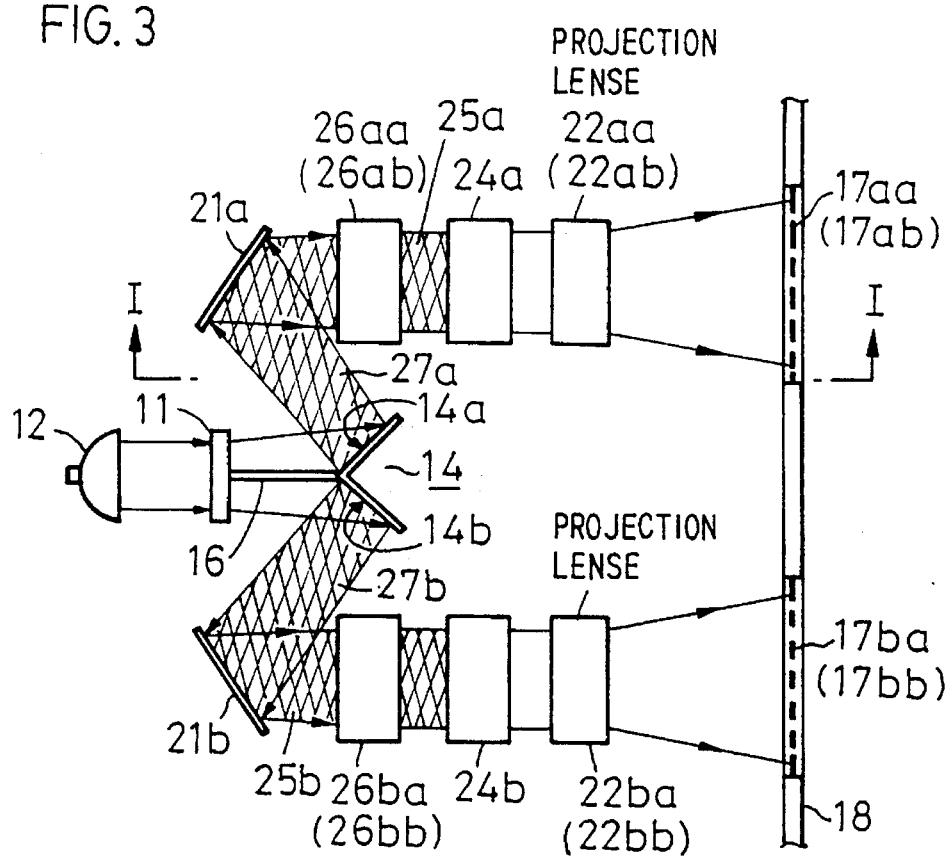
FIG. 3 is a plan view illustrating another embodiment of the present invention in which the display image on the liquid crystal display panel is split into four individual images for projection onto different screens.
Figure 4:
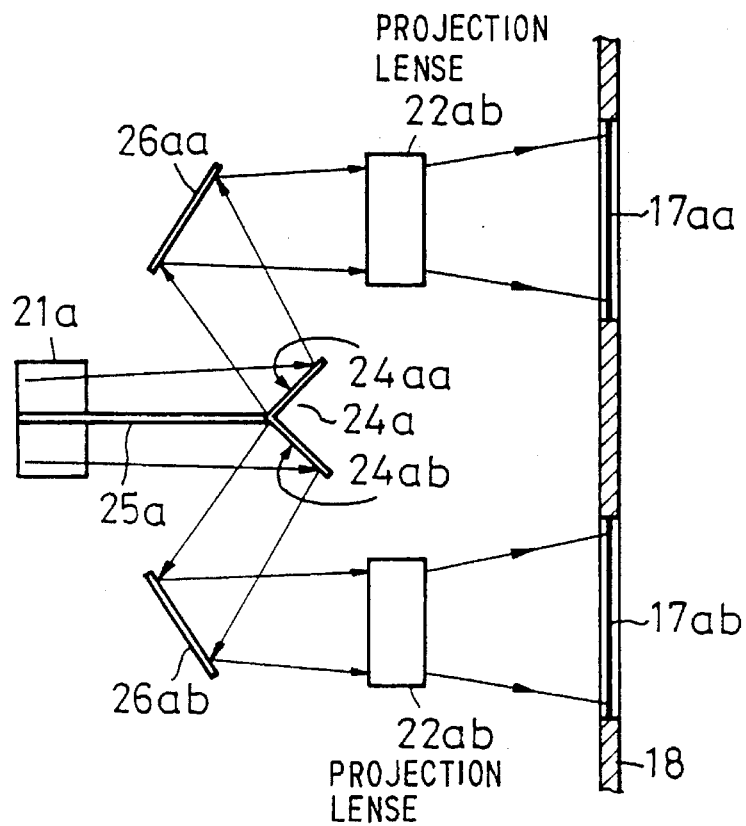
FIG. 4 is a side view of the FIG. 3 embodiment from the direction of the line I—I in FIG. 3.

In FIGS. 3 and 4 there is illustrated another embodiment of the present invention in which the display image on the liquid crystal display panel is split into four individual images for display on different projection screens. The parts corresponding to those in FIG. 1 are identified by the same reference numerals. FIG. 4 is a sectional view taken on the line I—I in FIG. 3. As is the case with the FIG. 1 embodiment, the image projected from the liquid crystal display panel 11 is split by the polygon mirror 14 and the shield plate 16 into two right and left images. The rays reflected by the reflecting surfaces 14a and 14b are further reflected by reflecting mirrors 21a and 21b and then split by polygon mirrors 24a and 24b into two upper and lower images, respectively. In this embodiment, as shown in FIG. 4, the reflecting mirror 24a has two reflecting surfaces 24aa and 24ab as is the case with the polygon mirror 14, a shield plate 25a is interposed between the marginal edge or ridge of the polygon mirror 24a along which the reflecting surfaces 24aa and 24ab adjoin and a line dividing the reflecting surface of the reflector 21a into equal upper and lower surface areas, and a shield plate 27a is similarly interposed between lines dividing the surfaces of the reflecting surface 14a and the reflecting mirror 21a into equal upper and lower surface areas, respectively. Thus, upper and lower reflected rays from the reflecting surface 14a, that is, upper and lower reflected rays from the reflecting mirror 21a are reflected upward and downward by the reflecting surfaces 24aa and 24ab, respectively. These upward and downward reflected rays are reflected forward by reflecting mirrors 26aa and 26ab and projected by projection lenses 22aa and 22ab onto screens 17aa and 17ab to form thereon magnified images.

Also at the side of the reflecting mirror 21b, though not shown, upper and lower reflected rays from the reflecting surface 14b, that is, upper and lower reflected rays from the reflecting mirror 21b are reflected upward and downward by the polygon mirror 24b and isolated by shield plates 25b and 27b and the reflected rays are further reflected forward by reflecting mirrors 26ba and 26bb and projected by projection lenses 22ba and 22bb onto projection screens 17ba and 17bb to form thereon magnified images. With such a construction as described above, when rhombic, X-shaped, circular and square images are displayed in upper right, lower right, upper left and lower left areas 15aa, 15ab, 15ba and 15bb of the display surface 15 of the liquid crystal display panel 11 as depicted in FIG. 5A, the light transmitted through the display panel 11 is split by the shield plate 16 and the polygon mirror 14 into the light transmitted through the right-hand areas 15aa and 15ab and the light transmitted through the left-hand areas 15ba and 15bb. The transmitted light from the right-hand areas 15aa and 15ab is split by the shield plates 27a, 25a and the polygon mirror 24a into light from the upper right area 15aa and light from the lower right area 15ab, which are projected onto the upper right and lower right screens 17aa and 17ab to form thereon magnified images, respectively, as shown in FIGS. 5B and 5C. The transmitted light from the left-hand areas 15ba and 15bb is split by the shield plates 27b, 25b and the polygon mirror 24b into light transmitted through the upper left area 15ba and light transmitted through the lower left area 15bb, which are projected onto the upper left and lower left screens 17ba and 17bb to form thereon magnified images, respectively, as depicted in FIGS. 5D and 5E. The shield plates 25a and 27a, or 25b and 27b may be formed integrally with each other, as required.

Figure 6:
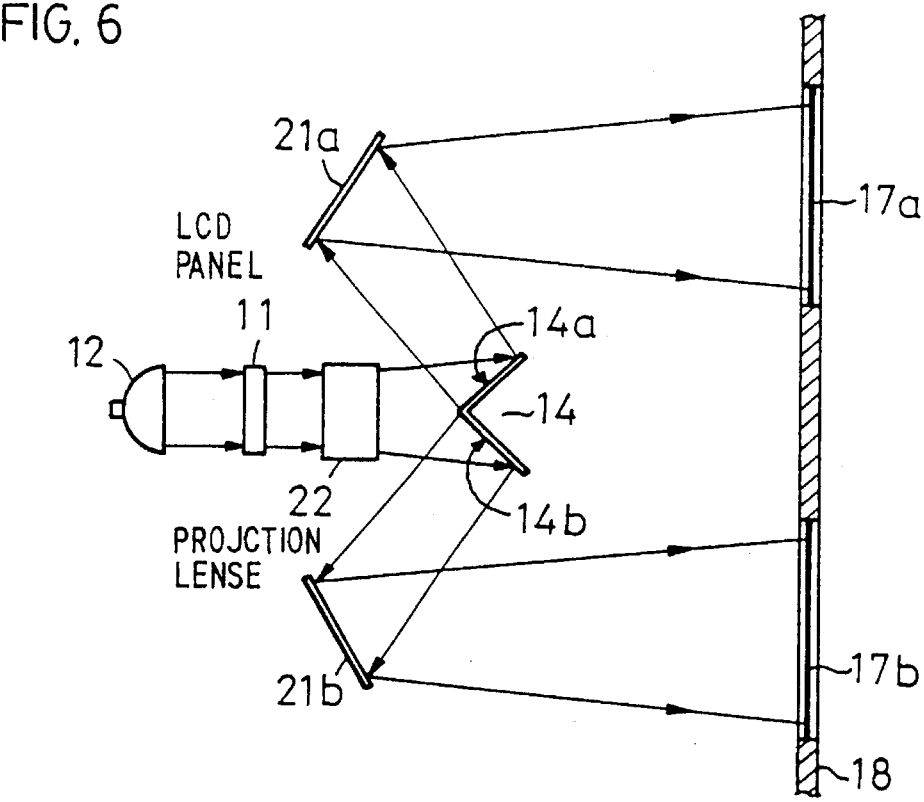
FIG. 6 is a plan view illustrating another embodiment of the present invention in which the image on the liquid crystal display panel is displayed intact onto a plurality of screens.

While in the above the image on the display surface 15 of the liquid crystal display panel 11 is split into individual images for display on separate projection screens, the display image on the display surface 15 can also be displayed intact on a plurality of separate screens. An example of the arrangement therefor is illustrated in FIG. 6, in which the parts corresponding to those in FIG. 1 are identified by the same reference numerals. In this instance, the shield plate 16 and the projection lenses 22a and 22b in FIG. 1 are omitted but a projection lens 22 is disposed between the liquid crystal display panel 11 and the polygon mirror 14. The optical path lengths from the reflecting surfaces 14a and 14b of the polygon mirror 14 to the corresponding projection screens 17a and 17b are made equal.

Figure 7A:
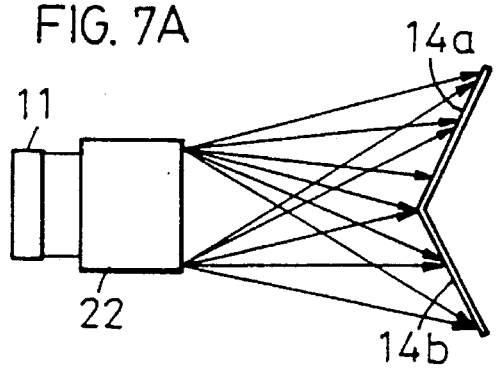
FIG. 7A is a diagram showing how light transmitted through the liquid crystal display panel 11 of FIG. 6 reaches a polygon mirror 14.
Figure 7B:
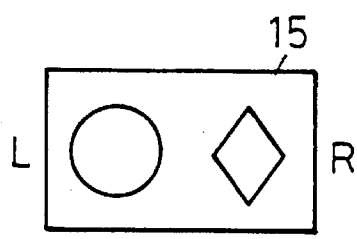
FIG. 7B is a diagram showing an example of the display image on the liquid crystal display panel.
Figure 7C:
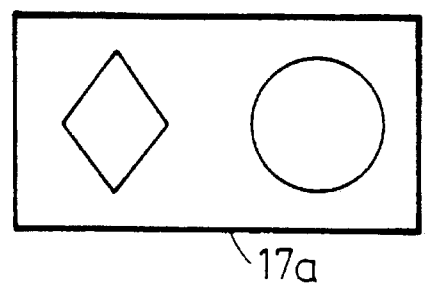
FIGS. 7C and 7D are diagrams showing images projected on screens 17a and 17b respectively corresponding to the image on the liquid crystal display panel.
Figure 7D:
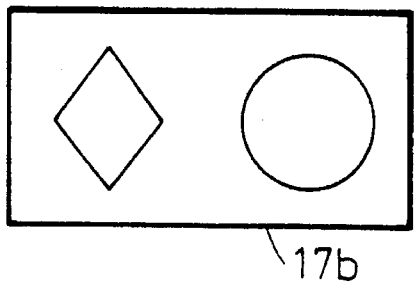

The light having passed through the liquid crystal display panel 11 is scattered light, though not mentioned in the embodiments described above, and the light impinges on the polygon mirror 14 after being magnified by the projection lens 22 as shown in FIG. 7A. The rays of light transmitted through respective parts of the liquid crystal display panel 11 reach either of the reflecting surfaces 14a and 14b as depicted in FIG. 7A. These rays of light are reflected by the reflecting surfaces 14a and 14b and are further reflected forward by the reflecting mirrors 21a and 21b for projection onto the screens 17a and 17b. The display image on the liquid crystal display panel 11 is projected as an inverted image by the projection lens 22 onto the screens 17a and 17b. For example, when circular and rhombic images are displayed side by side on the display surface 15 of the liquid crystal display panel 11 as shown in FIG. 7B, inverted versions of the circular and rhombic images are displayed on the screens 17a and 17b as shown in FIGS. 7C and 7D.

Also in the FIG. 3 embodiment, by omitting the shield plates 16, 25a, 25b, 27a and 27b and the projection lenses 22aa, 22ab, 22ba and 22bb and inserting the projection lens 22 between the liquid crystal display panel 11 and the polygon mirror 14 as in the case of FIG. 6, inverted images of the display images on the liquid crystal display panel 11 are displayed on the four screens 17aa, 17ab, 17ba and 17bb, respectively.

Figure 8:
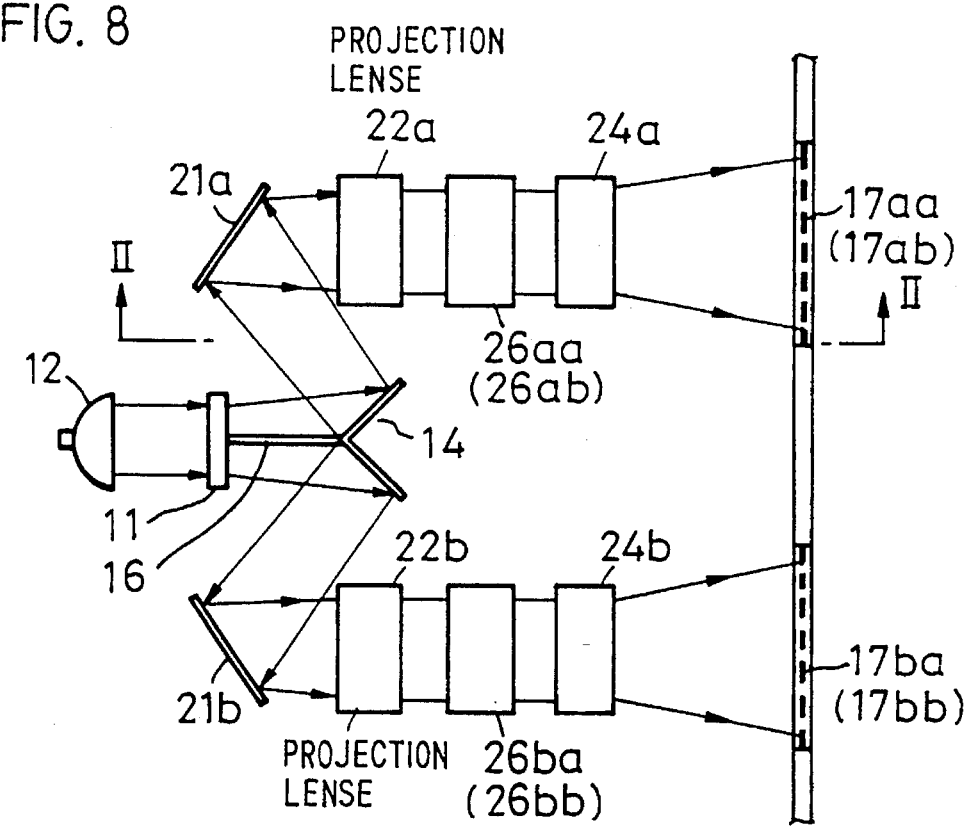
FIG. 8 is a plan view illustrating another embodiment of the present invention in which the display image on the liquid crystal display panel is split into individual images and the images are each displayed on a plurality of screens.
Figure 9:
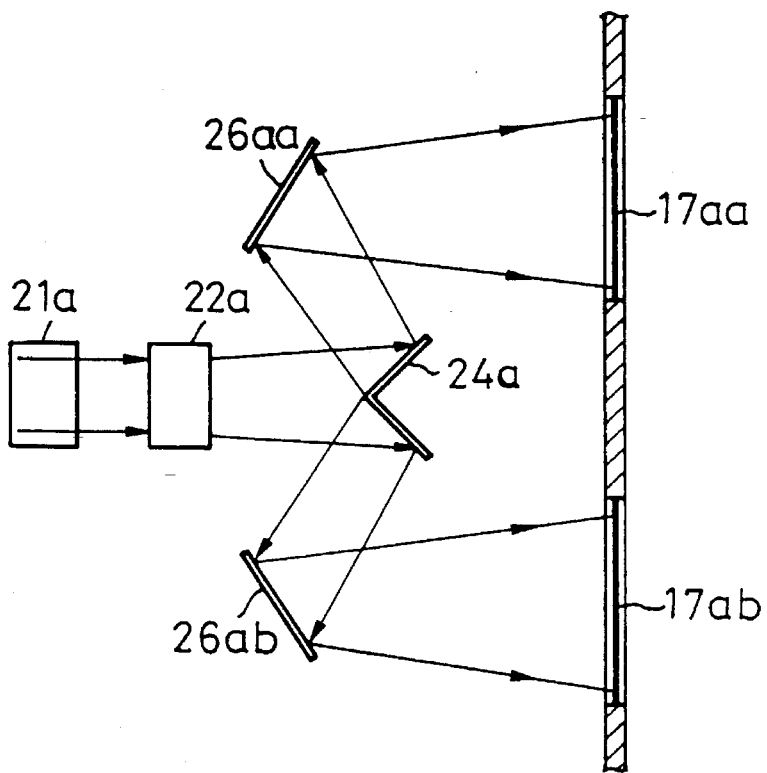
FIG. 9 is a side view of the FIG. 8 embodiment from the direction of the line II—II in FIG. 8.

FIGS. 8 and 9 illustrate another embodiment of the present invention in which one and the other halves of the display image on the liquid crystal display panel are each displayed on a plurality of projection screens. The parts corresponding to those in FIGS. 3 and 4 are identified by the same reference numerals. In this embodiment, the shield plates 27a, 27b, 25a and 25b and the projection lenses 22aa, 22ab, 22ba and 22bb are omitted, but instead projection lenses 22a and 22b are disposed between the reflecting mirror 21a and the polygon mirror 24a and between the reflecting mirror 21b and the polygon mirror 24b, respectively. The optical path lengths from the reflecting surfaces 24aa and 24ab of the polygon mirror 24a to the projection screens 17aa and 17ab are equal to each other; and the optical path lengths from the reflecting surfaces 24ba and 24bb of the polygon mirror 24b to the projection screens 17ba and 17bb are also equal to each other.

With the construction described above, when such an image as shown in FIG. 5A is displayed on the display surface 15 of the liquid crystal display panel 11, the light transmitted through the right-hand display areas 15aa and 15ab and the light transmitted through the left-hand display areas 15ba and 15bb are isolated by the shield plate 16 and the polygon mirror 14. The thus isolated transmitted light from the right-hand display areas 15aa and 15ab is reflected by the reflecting mirror 21a, the reflected light is then magnified and projected by the projection lens 22a onto the polygon mirror 24a and split by its reflecting mirrors 24aa and 24ab to two directions for projection onto the screens 17aa and 17ab after reflection by the reflecting mirrors 26aa and 26ab. Thus, the images on the right half area of the display surface 15 (FIG. 5A) are displayed as inverted, magnified images on the upper right and lower right projection screens 17aa and 17ab, respectively, as shown in FIGS. 10A and 10B. Similarly, the images on the left half area of the display surface 15 are projected as inverted, magnified images by the projection lens 22b onto the screens 17ba and 17bb, respectively, as depicted in FIGS. 10C and 10D.

Figure 12:
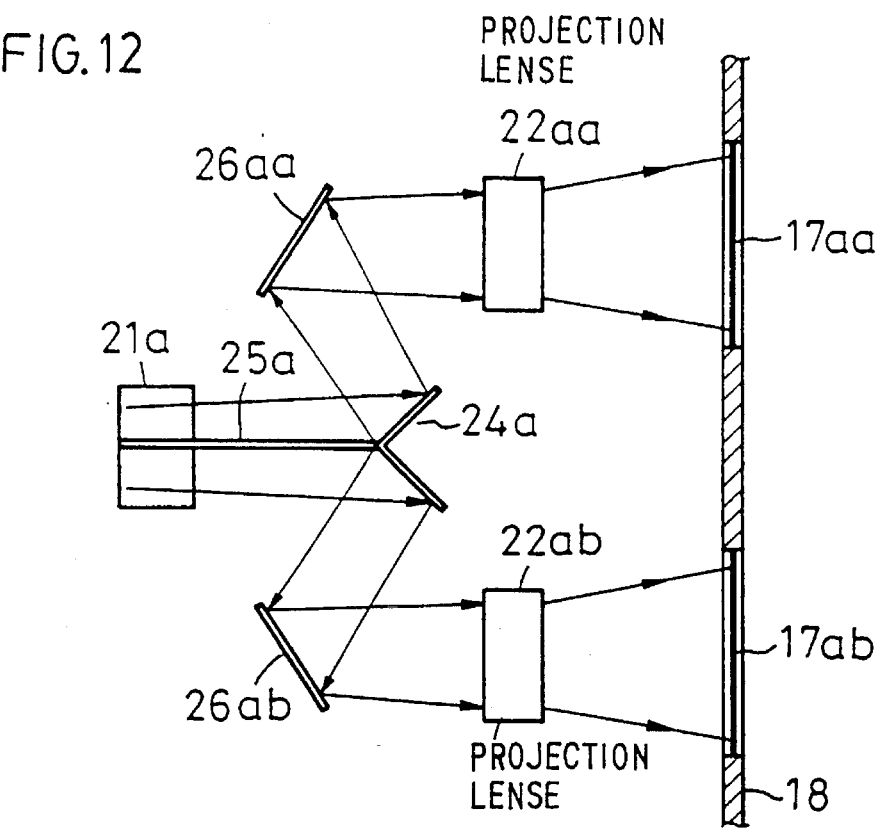
FIG. 12 is a side view of the FIG. 11 embodiment from the direction of the line III—III in FIG. 11.
Figure 13C:
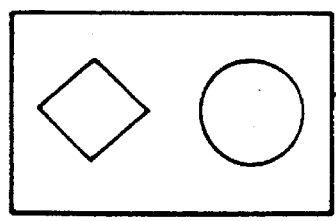
FIGS. 13A–13D are diagrams showing examples of images which are displayed on screens 17aa, 17ab, 17ba and 17bb in the FIG. 11 embodiment.
Figure 13:
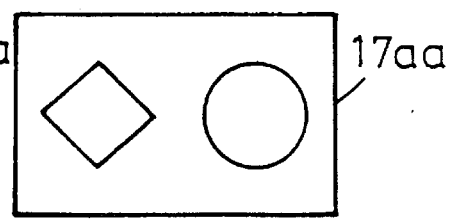
Figure 13D:
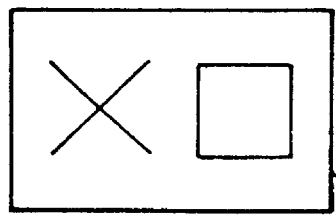
Figure 13B:
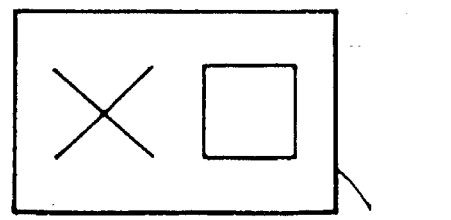

FIGS. 11 and 12 illustrates still another embodiment of the present invention in which the upper half and lower half images on the display surface 15 of the liquid crystal display panel 11 are each displayed on a plurality of projection screens. The parts corresponding to those in FIGS. 3 and 4 are identified by the same reference numerals. This embodiment differs from the embodiment of FIGS. 3 and 4 in that a shield plate 28 is provided in place of the shield plate 16. The shield plate 28 is disposed between the liquid crystal display panel 11 and the polygon mirror 14 in such a manner as to divide the display surface 15 into two equal areas in the vertical direction. The shield plate 28 may also be formed as a unitary structure with the shield plates 27a and 27b. With this construction, the light transmitted through the display surface 15 of the liquid crystal display panel 11 is split by the shield plates 25a, 25b, 27a, 27b and 28 into two upper and lower rays of light, these rays of light are further split by the polygon mirrors 24a and 24b into rays of light transmitted through the upper areas 15aa and 15ba of the display surface 15 and rays of light transmitted through the lower areas 15ab and 15bb of the display surface 15, and these rays of light are projected by the projection lenses 22aa, 22ba and 22ab, 22bb onto the upper screens 17aa, 17ba and the lower screens 17ab, 17bb, respectively. When the display images on the display surface 15 are such as shown in FIG. 5A, such images as depicted in FIGS. 13A through 13D are displayed on the screens 17aa, 17ab, 17ba and 17bb. Such displays could similarly be produced by splitting the transmitted light from the display screen 15 into upper and lower rays, not right-hand and left-hand rays of light, in the embodiment of FIGS. 8 and 9.

Although in the embodiment of FIG. 1 the images on the right-hand and left-hand areas of the display surface 15 are separated and displayed on the separate projection screens, the imaged on the upper and lower areas of the display surface 15 may also be displayed on separate projection screens. Incidentally, the display image on the liquid crystal display panel 11 need not always be magnified when it is projected onto screens. Furthermore, the screens need not necessarily be flush with each other.

As described above, according to the present invention, the display image on the liquid crystal display panel can be split into individual images for projection onto separate projection screens, or the display image on the display panel can be displayed intact on a plurality of projection screens; alternatively, the display image on the display panel can be split into individual images and these images can each be displayed on a plurality of projection screens. Accordingly, the display device of the present invention is less costly than in the case of providing a liquid crystal display and a CRT display for each projection screen.

In the case of the split display, an image signal composed of a combination of various images is prepared, and in the other cases, a plurality of different image signals are prepared; for example, when the present invention is applied to a video game, it is possible to change the images on the screens by selectively switching the image signal which is supplied to the liquid crystal display panel in accordance with progress of the game being played.

In the case of a color display, in particular, images can be magnified and displayed on a plurality of screens by use of an inexpensive, small liquid display panel 11—this is far less costly than providing a color liquid crystal display panel as an individual screen of a certain size. Moreover, the display device of the present invention can be made less expensive and less space-consuming than a display device in which small liquid crystal display panels are provided as individual screens.

It will be apparent that many modifications and variations may be effected without departing from the scope of the novel concepts of the present invention.

What is claimed is:

1. A distributed projection type liquid crystal display device comprising:

a transmission type liquid crystal display panel for displaying an image;

a light source for irradiating said transmission type liquid crystal display panel with light;

a plurality of screens disposed at different places for displaying, respectively, different parts of the image displayed on said liquid crystal display panel, a plurality of optical paths being defined between the liquid crystal display panel and respective ones of said screens;

a first polygon mirror having a plurality of reflecting surfaces for reflecting light, transmitted through said transmission type liquid crystal display panel, in different directions;

projection lens means for projecting rays of light reflected by said first polygon mirror through said optical paths;

a first shield plate interposed between said liquid crystal display panel and said first polygon mirror for optically isolating portions of said optical paths between respective reflecting surfaces of said first polygon mirror and respective display areas of said liquid crystal display panel; and a plurality of optical isolating means provided in cascade in the optical paths of rays of light reflected by said first polygon mirror, respectively, each of said optical isolating means comprising a second shield plate and a second polygon mirror for optically isolating other portions of said optical paths and for reflecting the rays of light in different directions, said projection lens means including a plurality of projection lenses. disposed downstream of said second polygon mirrors, respectively, for projecting the rays of light reflected by said second polygon mirrors onto said plurality of screens.

2. A distributed projection type liquid crystal display device comprising:

a transmission type liquid crystal display panel for displaying an image;

a light source for irradiating said transmission type liquid crystal display with light;

a plurality of screens disposed at different places for displaying, respectively, different parts of the image displayed on said liquid crystal display panel, a plurality of optical paths being defined between the liquid crystal display panel and respective ones of said screens;

a first polygon mirror having a plurality of reflecting surfaces for reflecting light, transmitted through said transmission type liquid crystal display panel, in different directions;

projection lens means for projecting light reflected in said different directions by said first polygon mirror through said optical paths onto said plurality of screens, respectively;

a first shield plate interposed between said liquid crystal display panel and said first polygon mirror for optically isolating portions of said optical paths between said display panel and each reflecting surface of said first polygon mirror, said projection lens means including a plurality of projection lenses disposed in the paths of the light reflected by said first polygon mirror; and a plurality of second polygon mirrors disposed subsequent to said projection lenses for reflecting light projected in said different directions by said projection lenses onto said screens, respectively.

3. A distributed projection type liquid crystal display device comprising:

a transmission type liquid crystal display panel for displaying an image;

a light source for irradiating said transmission type liquid crystal display panel with light;

a plurality of screens disposed at different places, for displaying different parts of the image displayed on said liquid crystal display panel, a plurality of optical paths being defined between the liquid crystal display panel and respective ones of said screens;

a first polygon mirror having a plurality of reflecting surfaces for reflecting light, transmitted through said transmission type liquid crystal display panel, in different directions;

a first shield plate located between said liquid crystal display panel and said first polygon mirror transverse to the reflecting surfaces of said first polygon mirror for optically separating portions of said optical paths between said liquid crystal display panel and said first polygon mirror into a plurality of individual optical paths;

a plurality of second polygon mirrors each having a plurality of reflecting surfaces, said second polygon mirrors being respectively disposed in said individual optical paths of light reflected by said first polygon mirror;

a plurality of second shield plates interposed respectively between the reflecting surfaces of said first polygon mirror and corresponding ones of said second polygon mirrors, for optically separating portions of said individual optical paths relative to respective reflecting surfaces of said second polygon mirrors; and a plurality of projection lenses disposed respectively in the paths of rays of light reflected by the reflecting surfaces of said second polygon mirrors, for projecting said rays of light onto said plurality of screens.

* * * * *